(12) United States Patent
Dworakowski

(10) Patent No.: US 11,380,014 B2
(45) Date of Patent: Jul. 5, 2022

(54) CONTROL MODULES AND METHODS

(71) Applicant: Aptiv Technologies Limited, St. Michael (BB)

(72) Inventor: Waldemar Dworakowski, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/178,039

(22) Filed: Feb. 17, 2021

(65) Prior Publication Data

US 2021/0295560 A1  Sep. 23, 2021

(30) Foreign Application Priority Data

Mar. 17, 2020 (EP) .................................... 20163605

(51) Int. Cl.
*H04N 5/225* (2006.01)
*H04N 5/232* (2006.01)
*G06T 7/80* (2017.01)

(52) U.S. Cl.
CPC ............ *G06T 7/80* (2017.01); *H04N 5/22521* (2018.08); *H04N 5/23203* (2013.01); *G06T 2207/30248* (2013.01)

(58) Field of Classification Search
CPC ............ G06T 7/80; G06T 2207/30248; H04N 5/23203; H04N 5/22521
See application file for complete search history.

(56) References Cited

U.S. PATENT DOCUMENTS

| | | |
|---|---|---|
| 7,164,117 B2 | 1/2007 | Breed et al. |
| 10,367,977 B2 | 7/2019 | Kim et al. |
| 2006/0038890 A1 | 2/2006 | MacIntosh et al. |
| 2009/0033747 A1* | 2/2009 | Chambers ............ G06V 10/993 348/E17.002 |
| 2009/0055685 A1 | 2/2009 | Mochida et al. |
| 2014/0160291 A1* | 6/2014 | Schaffner ................ H04N 5/247 348/148 |
| 2016/0006922 A1* | 1/2016 | Boudreau ................ B60R 1/00 348/207.1 |
| 2017/0150050 A1* | 5/2017 | Umeo ................... H04N 5/2624 |
| 2018/0053322 A1 | 2/2018 | Singh et al. |
| 2018/0076514 A1 | 3/2018 | Nugent et al. |
| 2018/0143032 A1* | 5/2018 | Rosario .................. G01C 21/36 |
| 2018/0265079 A1* | 9/2018 | Nakada ............... B60W 40/107 |

(Continued)

FOREIGN PATENT DOCUMENTS

| | | |
|---|---|---|
| CN | 104112363 | 5/2016 |
| DE | 102016110536 | 1/2017 |

(Continued)

OTHER PUBLICATIONS

"Extended European Search Report", EP Application No. 20163605.7, dated Aug. 27, 2020, 9 pages.

*Primary Examiner* — Zaihan Jiang

(74) *Attorney, Agent, or Firm* — Sawtooth Patent Group PLLC

(57) ABSTRACT

A control module comprises: a first interface to a camera provided in a vehicle; a second interface to a serializer for communication with an electronic control unit of the vehicle; and a processing unit configured to process input data received via the first interface or via the second interface to obtain output data, and to output the output data via the first interface or via the second interface.

20 Claims, 2 Drawing Sheets

(56) References Cited

U.S. PATENT DOCUMENTS

| | | | | |
|---|---|---|---|---|
| 2019/0266420 A1* | 8/2019 | Ge | .................. | G06K 9/6273 |
| 2019/0268574 A1* | 8/2019 | Tsukashima | ....... | A61B 17/0218 |
| 2020/0017026 A1* | 1/2020 | Kumar | .................. | G06F 3/012 |
| 2020/0137354 A1* | 4/2020 | Nathan | ................ | G06V 10/143 |
| 2020/0394467 A1* | 12/2020 | Shimazu | ............ | G06Q 30/0633 |
| 2021/0150556 A1* | 5/2021 | Kimura | ................ | G06Q 50/30 |
| 2021/0300403 A1* | 9/2021 | Kuwabara | ............. | B60W 50/14 |
| 2021/0306554 A1* | 9/2021 | Nose | ................ | H04N 5/23218 |

FOREIGN PATENT DOCUMENTS

| | | |
|---|---|---|
| DE | 102018116107 | 1/2019 |
| DE | 102018116108 | 1/2019 |
| EP | 3103246 | 12/2017 |
| EP | 3158553 | 11/2018 |
| EP | 3402186 | 11/2018 |
| EP | 3080677 | 1/2019 |
| EP | 1054335 | 11/2020 |
| JP | 2016225713 | 12/2016 |
| WO | 9631047 | 10/1996 |
| WO | 0131497 | 5/2001 |
| WO | 2012037129 | 3/2012 |
| WO | 2015054194 | 4/2015 |
| WO | 2016018487 | 2/2016 |
| WO | 2016154936 | 10/2016 |
| WO | 2016154944 | 10/2016 |
| WO | 2016154946 | 10/2016 |
| WO | 2017011814 | 1/2017 |
| WO | 2017011817 | 1/2017 |
| WO | 2017117519 | 7/2017 |

\* cited by examiner

CONTROL MODULES AND METHODS

CROSS-REFERENCE TO RELATED APPLICATION

This application claims priority to European Patent Application Number 20163605.7, filed Mar. 17, 2020, the disclosure of which is hereby incorporated by reference in its entirety herein.

BACKGROUND

The present disclosure relates to control modules and methods.

Digital imaging devices, such as digital cameras, for example remote camera, are used in automotive applications for various applications, for example for monitoring the occupants (for example driver) of a vehicle or a surrounding of the vehicle.

The cameras should be simple and easy to connect. In new designs, remote cameras may include memory components to enable easier configuration and means for protection against copying. However, the cameras must be properly configured and tested on the startup, which may take several seconds (sometimes even more than 10 seconds). Processing tasks are commonly delegated to the ECU (electronic control unit), where a processor also is used for initializing other components before coming to camera initialization. At the same time, the user requires almost immediate operation of the camera.

Furthermore, with the advent of autonomous vehicles, it may be desired to operate more and more cameras simultaneously, and this may lead to the control channels (for example I2C) becoming a potential bottleneck.

Accordingly, there is a need for improved control of camera in vehicles.

SUMMARY

The present disclosure provides a control module, a computer implemented method, a computer system, a non-transitory computer readable medium, and a vehicle according to the independent claims. Embodiments are given in the subclaims, the description and the drawings.

In one aspect, the present disclosure is directed at a control module comprising: a first interface to a camera provided in a vehicle; a second interface to a serializer for communication with an electronic control unit of the vehicle; and a processing unit configured to process input data received via the first interface or via the second interface to obtain output data, and to output the output data via the first interface or via the second interface.

In other words, a control module may be provided in between the camera and the serializer (wherein the serializer may communicate with the electronic control unit (ECU) of the vehicle), and may either forward the signals received from the camera to the serializer and from the serializer to the camera, or may intercept the signals received from the camera or from the serializer and respond to the signals without forwarding the signals. This may reduce communication effort on the serial connection between the serializer and the ECU, and may reduce computational efforts of the ECU.

With the control module according to various embodiments, a fast starting ASIL (Automotive Safety Integrity Level) graded remote camera may be provided. ASIL grading may require measures to ensure proper operation also if some kind of error occurs. For example, in order to be ASIL graded, the camera shall provide an ability to check for internal health so that it may detect errors and provide information on its state. In some cases, ASIL graded cameras may even be required to ensure proper operation in the case of an error.

According to another aspect, the control module further comprises a memory configured to store information related to the camera. For example, information that may be repeatedly (for example at every start up) requested by the ECU from the camera or that may be provided from the ECU to the camera may be stored in the memory, and then the information may be provided directly from the memory of the control module (instead of from the camera or from the ECU). This may allow starting up the camera without the ECU being involved (since the control module may provide the data or information or control instructions which are usually provided by the ECU, so that the ECU may focus on other tasks during start up and at the same time, the camera is available at a short time after startup).

According to another aspect, the input data comprises configuration or calibration data for the camera. For example, the configuration data or calibration data may be provided from the camera to the control device, and may then be stored in the control device. The calibration parameters may include operation parameters such as voltage or current requirements, shutter speed, ISO settings, pixel binning options, color calibration data, dark image data (to compensate for "hot pixels"), or the like.

According to another aspect, the output data comprises configuration or calibration data for the camera. For example, configuration or calibration data that has been previously received from the camera and saved in the memory may be obtained from the memory and be used in further processing and/or be forwarded to the ECU, without requesting the configuration or calibration from the camera again.

According to another aspect, the output data comprises identification data identifying the camera. The identification data may include data indicating a type of the camera and/or requirements of the camera for proper operation (for example allowable maximum or minimum operating temperatures).

According to another aspect, the processing unit is configured to carry out a run time check of the camera. At run time, the camera may be constantly or intermittently checked for valid operation. When camera is in operation, priority may be to provide connectivity for the video components (imager and video processor for example via a video lane), but at the same time, the camera may also be monitored for the validity of the operation.

According to another aspect, the run time check comprises a check of at least one of the following: a voltage drawn by the camera (in other words: a voltage drop over the camera or a voltage applied to the camera), a current drawn by the camera, a temperature of the camera, or a link quality to the camera. By avoiding that the multiple factors (voltages, temperature etc) must be checked and reported directly and separately to the ECU, heavy loading of the control channels may be may avoided. Furthermore, by checking the link quality, it may be ensured that the cameras have a good quality link for allowing quick setup and testing at the run time.

According to another aspect, the output data comprises at least one of a summary of results of the run time check or a detailed report of the results of the run time check. For example, a summary of the results may be an indication as to whether or not the run time check revealed any fault or not. For example, the summary of the results may be available at a higher frequency than the detailed report. For example, a detailed report may be provided upon request (for example, if it is determined by the ECU that a fault has occurred (for example based on the summary of the results), the ECU may request a detailed report in order to precisely locate the fault).

According to another aspect, the input data and/or the output data comprise synchronization data. Multiple sensors operating the same time provide demand on them to be synchronous to make fusion of data easier. At the same time in real live systems, it may be desired that operation of the sensor(s) is matched with a current situation. As an example, a camera may be set to a 'shooter speed' (or shutter speed) related to the light availability and to the current mode of the operation. At the same time, the front camera(s) and side camera(s) may use different lenses and sensors, which may lead to suboptimal settings when used for both devices. Based on the synchronization data, all cameras may be synchronized with the central time source (for example provided in the vehicle and/or provided in the ECU) with exposure time clearly related to that time. Furthermore, the vehicle ECU synchronization may be used to synchronize exterior and interior cameras for calibration.

According to another aspect, the processing unit is configured to determine a type of the camera and to process the input data based on the determined type of the camera. Information indicating the type may be stored in a memory of the control module (or in a memory associated or connected with the control module). More than one camera may be connected to the control module at the same time, and various types of cameras may be connected at the same time. According to various embodiments, multiple types of the imagers or cameras may be interfaced. Differences between different types of imagers or cameras may be compensated for by the control module. Furthermore, security and safety of the design (both as it comes to potential counterfeit and sabotage or mishandling) may be ensured by various embodiments, by taking control of the different types of cameras (which may include a check as to whether the camera is safe to operate and whether the camera is a counterfeit camera or not).

In another aspect, the present disclosure is directed at a vehicle comprising the control module as described above, the camera; the serializer; and the electronic control unit.

According to another aspect, the control module is configured to configure the camera during a startup of the vehicle and/or during a startup of the electronic control unit (ECU). Since the control module may be responsible only for the camera (or the plurality of cameras if more than one camera is provided), the control module may directly start processing at the time of startup, while the ECU is handling other tasks.

According to various embodiments, at least hundreds of ms to dozens of seconds of the startup time may be gained, changing perceived startup time for the user. At the same time, gain may be achieved in all areas of cybersecurity (initialization and configuration update), safety (build in diagnostic independent on the ECU), and time synchronization (clock synchronization).

In another aspect, the present disclosure is directed at a computer implemented method (for example control method) for processing data received via a first interface to a camera provided in a vehicle or via a second interface to a serializer for communication with an electronic control unit of the vehicle, the method comprising the following steps performed (in other words: carried out) by computer hardware components: determining output data based on the received data; and outputting the output data via the first interface or via the second interface.

In another aspect, the present disclosure is directed at a computer system, said computer system comprising a plurality of computer hardware components configured to carry out several or all steps of the computer implemented method described herein.

The computer system may comprise a plurality of computer hardware components (for example a processing unit, at least one memory unit and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
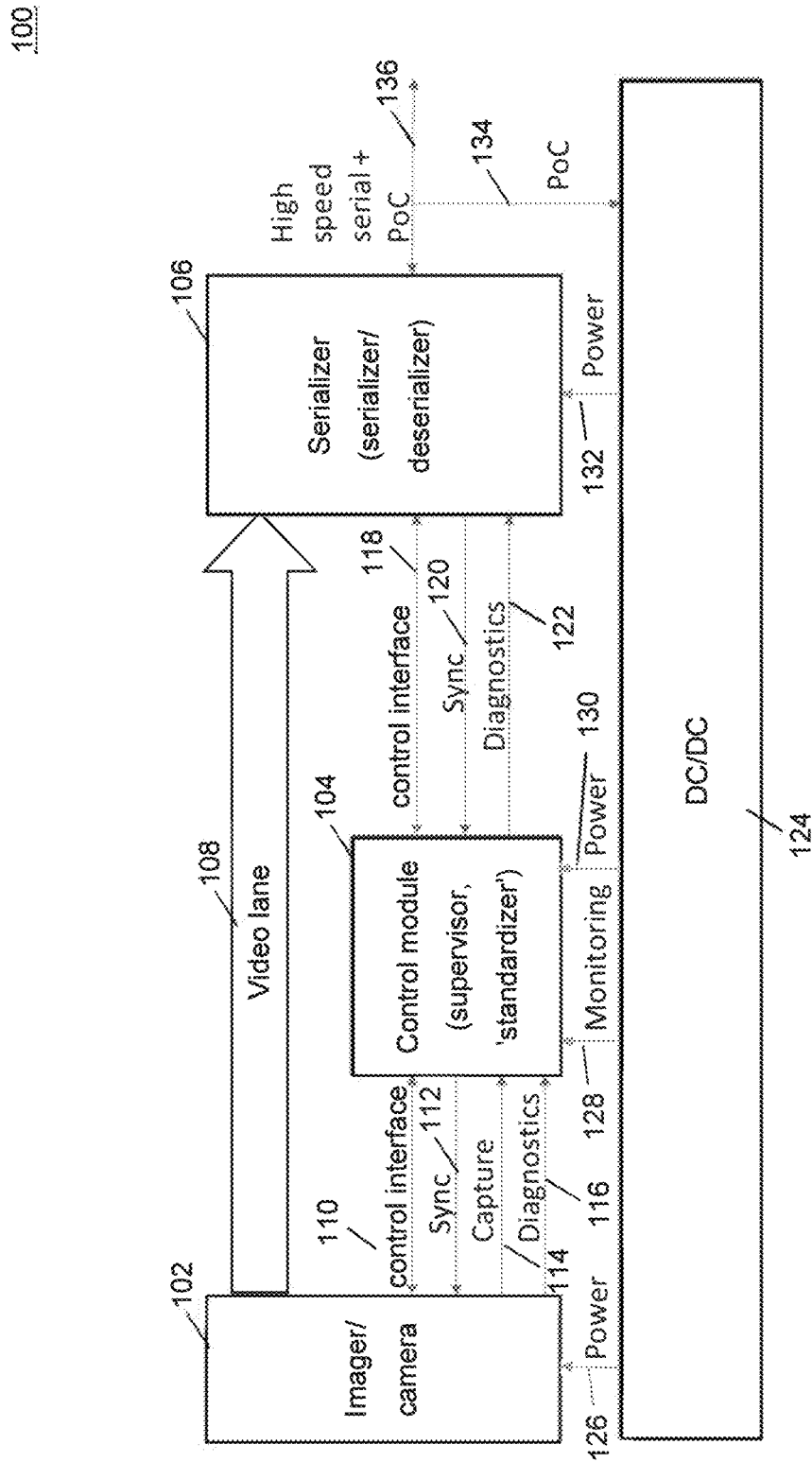
FIG. 1 an illustration of a system including a control module 104 according to various embodiments.

FIG. 1 shows an illustration 100 of a system including a control module 104 according to various embodiments. The control module 104 may also be referred to as 'supervisor' or 'standardizer'. An imager 102 (in other words: image sensor, for example an image sensor of a camera, for example a remote camera) does not have a direct control channel from a serializer/deserializer 106 (which may be connected to an ECU; electronic control unit) via a high speed serial and PoC (power over coax) connection 136. The serializer/deserializer 106 (which may be referred to as serializer for sake of brevity) may be used as the communication means to provide high speed signals over relatively large distance between the ECU on one side and the imager 102 and the control module 104 on the other side. Instead of using a direct communication between the imager 102, serializer 106 and ECU, the additional component of the control module 104 may be used according to various embodiments.

A remote camera may be a camera which is not integrated with the ECU directly but connected to the ECU via a (usually long) connection. For example, rear cameras and side cameras are usually remote cameras. Front cameras may be remote cameras or may be integrated with the ECU.

The control module 104 may be provided between the imager 102 and the serializer 106, and may either forward or modify data transmitted on the control interface lines 110, 118, the sync lines 112, 120, and the diagnostic lines 116, 122.

The control interface lines 110, 118 may provide an interface for control of the integrated circuits, for example according to I2C or an SPI.

According to various embodiments, the control module 104 may be provided between the imager 102 and the serializer 106. This may enable operation of the imager 102 by control of the control module 104, and independent from any interaction with the ECU. As a result, the ECU may interrogate the camera 102 on its state at the same the control module 104 interacts with the imager 102. At the same time, some control functions (for example measurements of voltage levels as seen by the imager 102) may be delegated from the ECU to the camera control module 104.

The sync lines 112, 120 may be used to enforce time synchronization in the remote camera 102 with the ECU, for example using a serializer GPIO (general-purpose input/output) line. This time synchronization may be part of the time synchronization as described herein, or may be used independently as to be used to signify an expected (for example expected by the ECU) image capture time.

The sync line 112 between the control module 104 and the imager 102 may be used to synchronize operation of the imager 102. For example, a high speed clock may be used which frequency could be adjusted using the control module 104 to achieve a proper framerate. In another example, a shutter line may be used to control the moment when the image capture occurs.

The capture line 114 may indicate when physical capture is being done by the imager 102. The capture line 114 may provide a feedback signal from the imager 102 indicating that the shutter is open. In embodiments where a capture line 114 is not provided, the indication whether the shutter is open may be determined using different means, for example, imager register polling (in other words: cyclic reading of a register of the imager 102) by the control module 104. The control module 104 may check the shutter state (for example 'shutter open' or 'shutter closed') periodically (and independent from ECU) by reading a pre-determined register of the imager. Instead of checking the state by register polling, registration in the reading queue may be used.

The imager diagnostics line 116 may provide information about potential failures. In an embodiment where an image diagnostics line 116 is not present, other means, like imager register polling or interaction with imager 102 by the control module 104, may be used. Information about potential failures may allow ASIL related monitoring of the state of the camera 102, together with other means (like for example power supply monitoring (indicated via line 128), temperature monitoring, or control module internal diagnostics).

The camera diagnostics line 122 may alert the ECU about potential failures or abnormal states of the camera 102. According to various embodiments, the camera diagnostics line 122 may be combined or substituted with other means, like for example register polling over control line 118 or as injected error state in the video lane signal 108 provided to the ECU over the camera connection 136.

It should be understood that each of the lines 118 may include one or more physical lines.

The imager 102 may still be in direct contact with the serializer 106 via a video lane 108; in other words: the image data or video data provided by the imager 102 may not be routed through the control module 104.

A DC/DC (direct current/direct current) converter 124 may provide power to the various components, for example via a power supply line 126 to the imager 102, via a power supply line 130 to the control module 104, and via a power supply line 132 to the serializer 106. The DC/DC converter 124 may receive electric energy via a PoC (power over coax) line 134 (from the high speed serial and PoC line 136). The power supply lines 126, 130, 132 may be monitored to detect failures. In commonly used designs, power supply lines are monitored via the ECU by measurement or comparison with fixed levels, which may cause load on the interface and may cause issues when multiple cameras are used. According to various embodiments, the power supply lines 126, 130, 132 may be monitored via the control module 104 with fault signalization provided to the ECU so that the connection (for example connection 136) is less loaded on the diagnostic component. At the same time, more detailed diagnostic measurements may be done by the control module 104.

In the following, startup of the camera or imager 102 according to various embodiments will be described.

The control module 104 may start immediately after power is applied to the imager 102. The startup time of the control module 104 may be shorter than the startup time of the ECU, since the control module 104 may have a simple design and may provide functions tailored to the need of working in conjunction with the imager 102, as compared to the complex design and general requirements of the ECU. Before the start up procedure of the ECU comes to a stage of using the imager 102, the control module 104 may configure and test the imager 102, effectively taking over the communication channel (for example I2C channel or SPI cannel) and releasing it before the ECU uses the communication line.

In the case when the ECU is to write anything to the imager 102 and the control module 104 will not finish its tasks, then the ECU transaction may be delayed using a clock stretching technique. In this case, when the control module 104 operates the imager 102 and the ECU starts to request access to the imager 102, then the control module 104 may delay operation of the ECU by using 'clock stretching' as defined in the I2C standard. One of those rare yet possible cases when this may occur is when the imager 102 is a remote camera and the when the remote camera is temporarily disconnected of from the ECU, or the camera 102 is restarted.

In the following, identification of the camera or imager 102 according to various embodiments will be described.

After releasing the control interface line communication path (i.e. after switching to a mode of forwarding any communication between the imager 102 and the serializer 106 via the control interface lines 110 and 118), the control module 104 may 'self identify' the imager 102 to the ECU. It may be desired to securely identify whether the camera 102 is 'valid' (for example authentic and not a counterfeit product) and has a proper identifier (ID). In commonly used designs, identification may be done using reading a write-once-area in the imager or in an extended form as crypto-signature of the area; however, such an identification may either be spoofed or take long time. According to various embodiments, the internal storage verification may be delegated to the camera control module 104 while providing strong verification of short confirmation message. At the same time, any communication between the camera 102 and ECU may be protected even when the imager 102 does not support secure data transfer.

According to various embodiments, the ECU may provide 'invocation' (for example some random sequence to be written onto emulated I2C registers). The control module 104 may encrypt the invocation with the usage of its private key and may return the encrypted result to the ECU as the 'response' in other registers. Finally, the ECU may encrypt the response with a public key of the camera and provide the encrypted response to the control module 104. The whole sequence may mean transmission of less than 30 bytes, and may require less than 1 ms.

Encrypting the invocation using two different keys may be used for identification of the imager 102. For example, the ECU may send a random long number, for example including several hundreds of bits. The camera control module 104 may encrypt a block consisting of internally generated random salt, received from ECU, together with (for example followed by or preceded by) identification and calibration data which is stored in the camera 102. Encryption may be done using an asymmetric key being part of the structure of the camera control module 104 and protected within the camera control module 104 (for example like a secure element). The result may be an encrypted block, and the encrypted block may be provided to ECU where it is decrypted by the ECU in the internal cryptography module which protects its key to the camera provided data.

In the following, provisioning of the calibration values according to various embodiments will be described.

After identification ended successfully, the control module 104 may allow reading some part of a memory (for example provided in the control module 104 or attached to the control module 104) which stores camera characteristics. The camera characteristics may be provided using an emulation of an EEPROM (of the imager 102) under control of the control module 104. The data related to the camera characteristics may be stored as part of the structure of the control module 104.

In the following, programming of the calibration values (into the control module 104) according to various embodiments will be described.

In order to enable programming of the calibration values into the control module 104, a special mode of operation may be activated (for example using a similar mechanism as described above for identification of the camera). Usage of the public/private key pair may protect access to such mode of operation.

In the following, run time camera validity check according to various embodiments will be described.

The camera operation (for example the operation of the imager 102) may be constantly verified to inform (for example to inform the ECU) about any potential failures. According to various embodiments, the following measurements may be done by the control module 104: voltage check, temperature check, sanity check (for example of the imager 102, or of the link to the imager 102), or link quality. The control module 104 may have access via the control interface line 118 to the serializer 106 and finally to the ECU. Thus, the control module 104 may monitor the state of the connection to the ECU. The measurements may be carried out periodically and may be made available as a summary (for example as an I2C accessible register with value of 100 ms counter and simultaneously as line replicating a time synchronization signal and/or as a detailed report (indicating the voltages, temperature etc.). The self-check may be performed periodically, and as such, the timing mechanism may be established both to control the measurements and to be checked that it works with the required time schedule. Furthermore, instead of using a static error line, a line providing a different code or PWM ratio may be used to signalize the error.

In the following, synchronization of cameras (or imagers) according to various embodiments will be described.

The time in a vehicle is provided from a single source. All units (in particular all ECUs) receive that time and shall operate in relation to that time. According to various embodiments, the time may also be provided for operation in relation to the cameras provided in the vehicle.

At the startup of the vehicle, the ECU may provide the estimated current time to the control module 104. During the operation, the ECU may provide squarewave (or rectangular) time synchronization signals as a side channel on the serial connection to the camera. The frequency of the signal may be dependent on the required stability of the camera clock (for example, the frequency may be 1 Hz). At each edge of the signal, the ECU may provide a current precise time in the ECU (which may be synchronized with the time base of the vehicle). The control module 104, when seeing the edge of the signal, may capture the current internal time and compare this with time provided by the ECU and may modify the internal N/M divisor to make the internal clock stable and synchronized with the car time (i.e. the ECU time). At the same time, the control module 104 may provide a copy of the received signal to the ECU, so that the ECU may determine a transmission time and jitter which may be provided to the control module 104 as a way to make the time more precise.

According to various embodiments, the shutter may not be controlled directly or left it self-running. According to various embodiments, control of the shutter may be moved to synchronizing the time between the camera 102 and ECU, with the ECU being the loosely connected time source. This way of connection may reduce the load on the ECU and may provide that synchronization is a low priority process.

According to various embodiments, while the camera 102 may run with or without an internal generator, at one point such a signal may be established. After that, internal signals may be produced, leading to the process of taking images using the imager 102. One of the particular methods of doing that may be using M/N given frequency signal generation. However, it will be understood that instead of the divisors, software or a programmable logic may be used to replicate that process. As the result, a signal of a given frequency may be received, and due to the regulation, the phase alignment may be received as well. Thus, adjustments may be provided to the M/N coefficients, so that exposures may be made at predicted times. Furthermore, this may reduce workload on the ECU in multi camera systems and also on the fusion component.

It will be understood that N and M refer to two coefficients in the PLL loop used for frequency generation (which may be referred to as N/M frequency generation). According to various embodiments, the base clock may be multiplied by N and divided by M, and the output signal may be divided by one coefficient and compared to the base clock divided by the other coefficient. However, it will be understood that any other method may be used alternatively.

Using such internal time, the control module 104 may produce a stable clock time to the imager 102 to make the period of the frames precise. At the same time, the control module 104 may use either 'frame sync' input or 'flash' output to synchronize a moment when an exposure is to be made.

In the case of 'frame sync' input, the control module 104 may produce the signal according to a computed internal scheduling, allowing the configurations with multiple frame formats to be used as well.

In the case when 'flash' output is used, the control module 104 may capture the time when the signal was provided and then make it available to the ECU. When precision of the time of exposure would not be adequate, then the control module 104 may change the configuration of the imager 102 to take the next images at a proper time.

The usage of 'flash' output may be based on the design of the imagers which sometimes provide such output when an image is taken, which may provide a source for the control loop adjusting the moment when the image should be taken according to the time schedule based on the time source. In other words: a time source may be provided to the camera 102, and it may be expected that the camera 102 will schedule moments when images shall be taken. According to various embodiments, the ECU may provide a time source (using a low priority process) and the camera 102 may restore the time from the time source and then based on the time source may downregulate the frequencies of the internal signals in order to achieve images being shoot at pre-determined times. In order to achieve good synchronization, either a frame sync signal may be provided or a flash signal may be received to achieve proper loop of the control. With this method, the ECU may be offloaded and it may be ensured that the images are taken in well-defined moments of time. At the same time, the process of regulation may be relatively simple and may be carried out on specialized hardware or in a programmable logic or in a conventional central processing unit (CPU).

In the following, a camera hardware abstraction layer (HAL) according to various embodiments will be described.

More and more cameras are built with a variety of imagers. According to various embodiments, a compilation of required capabilities of imagers may be defined, and a HAL may be defined that exposes an idealized model to the software. The control module 104 may implement the HAL in such way that it may receive settings from the ECU and may then translate the settings to data to be provided to the imager 102 (in the correct format or with the correct content for that specific imager). At the same time, the control module 104 may allow access from the ECU to the imager. The clock stretching technique as described above may be implemented to eliminate any risk of access from multiple sources the same time.

Figure 2:
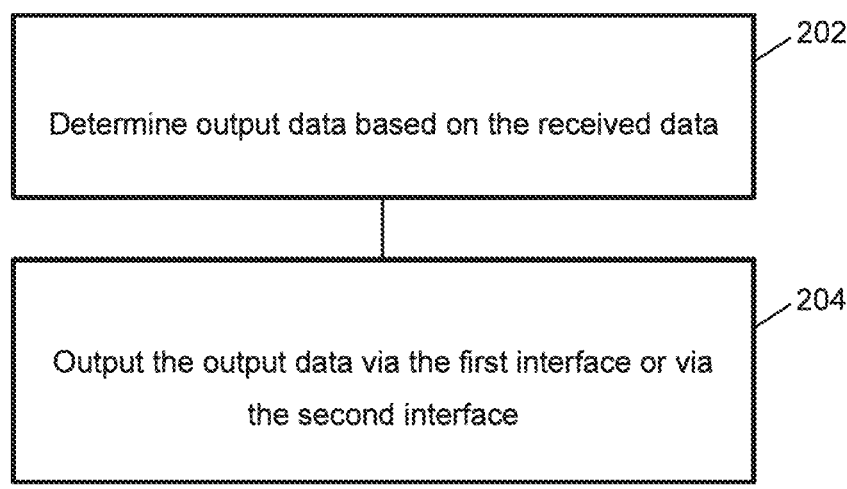
FIG. 2 a flow diagram illustrating a control method according to various embodiments.

FIG. 2 shows a flow diagram 200 illustrating a control method according to various embodiments. The control method may process data received via a first interface to a camera provided in a vehicle or via a second interface to a serializer for communication with an electronic control unit of the vehicle. At 202, output data may be determined based on the received data. At 204, the output data may be output via the first interface or via the second interface.

Each of the steps 202, 204 and the further processing described above may be performed by computer hardware components.

What is claimed is:

1. A system comprising:
   a camera configured to provide image data or video data;
   a serializer;
   an electronic control unit (ECU); and
   a control module executing on computer hardware components, the control module comprising:
      a first interface to the camera provided in a vehicle;
      a second interface to the serializer for communication with the ECU of the vehicle, the serializer being operably connected between the ECU and the camera via a first connection and between the ECU and the control module via one or more additional connections, the serializer being configured to route the image data or the video data from the camera to the ECU via the first connection and without routing through the control module; and
      a processing unit configured to:
         process input data received via the first interface or via the second interface to obtain output data; and
         output the output data via the first interface or via the second interface.

2. The system of claim 1, wherein the control module further comprises a memory configured to store information related to the camera.

3. The system of claim 1, wherein the input data comprises configuration or calibration data for the camera.

4. The system of claim 1, wherein the output data comprises configuration or calibration data for the camera.

5. The system of claim 1, wherein the output data comprises identification data identifying the camera.

6. The system of claim 1, wherein the processing unit is configured to carry out a run time check of the camera.

7. The system of claim 6, wherein the run time check comprises a check of at least one of a voltage drawn by the camera, a current drawn by the camera, a temperature of the camera, or a link quality to the camera.

8. The system of claim 7, wherein the output data comprises at least one of a summary of results of the run time check or a detailed report of the results of the run time check.

9. The system of claim 1, wherein at least one of the input data or the output data comprises synchronization data.

10. The system of claim 1, wherein the processing unit is further configured to determine a type of the camera and to process the input data based on the determined type of the camera.

11. The system of claim 1, wherein the system is part of the vehicle.

12. The system of claim 11, wherein the control module is further configured to configure the camera during a startup of the vehicle and/or during a startup of the electronic control unit.

13. A computer-implemented control method, the method comprising:
   processing input data received via:
      a first interface of a control module to a camera provided in a vehicle, the camera configured to provide image data or video data; or
      a second interface of the control module to a serializer for communication with an electronic control (ECU) unit of the vehicle, the serializer being operably connected between the ECU and the camera via a first connection and between the ECU and the control module via one or more additional connections, the serializer being configured to route the image data or the video data from the camera to the ECU via the first connection and without routing through the control module;
   determining output data based on the received input data; and
   outputting the output data via the first interface or via the second interface.

14. The method of claim 13, wherein processing the input data comprises executing the control module on computer hardware components of the vehicle for processing the input data.

15. The method of claim 13, further comprising:
storing information related to the camera by a memory.

16. The method of claim 13, wherein the input data comprises configuration or calibration data for the camera.

17. The method of claim 13, wherein the output data comprises configuration or calibration data for the camera.

18. The method of claim 13, wherein the output data comprises identification data identifying the camera.

19. The method of claim 13, further comprising:
executing a run time check of the camera.

20. A non-transitory computer readable medium comprising instructions that when executed configure computer hardware components of a vehicle to:
process input data received via:

a first interface of a control module to a camera provided in the vehicle, the camera configured to provide image data or video data; or a second interface of the control module to a serializer for communication with an electronic control (ECU) unit of the vehicle, the serializer being operably connected between the ECU and the camera via a first connection and between the ECU and the control module via one or more additional connections, the serializer being configured to route the image data or the video data from the camera to the ECU via the first connection and without routing through the control module;

determine output data based on the received input data; and output the output data via the first interface or via the second interface.

* * * * *